US011420280B2

(12) United States Patent
Apostolopoulos et al.

(10) Patent No.: US 11,420,280 B2
(45) Date of Patent: Aug. 23, 2022

(54) CLOSED SOCKET BRAZED JOINT ASSEMBLY

(71) Applicant: TRANSPORTATION IP HOLDINGS, LLC, Norwalk, CT (US)

(72) Inventors: Andreas Athanassios Apostolopoulos, Erie, PA (US); James Wayne, Erie, PA (US); Alan Glenn Frampton, Erie, PA (US); Kyle Kessler, Erie, PA (US); Ramesh Edara, Lawrence Park, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 312 days.

(21) Appl. No.: 16/245,918

(22) Filed: Jan. 11, 2019

(65) Prior Publication Data
US 2020/0223003 A1 Jul. 16, 2020

(51) Int. Cl.
*H02K 3/04* (2006.01)
*B23K 1/008* (2006.01)
*H02K 15/00* (2006.01)
*B23K 1/20* (2006.01)
*H02K 17/16* (2006.01)
*B61C 9/38* (2006.01)
*H02K 3/51* (2006.01)

(52) U.S. Cl.
CPC .............. *B23K 1/008* (2013.01); *B23K 1/203* (2013.01); *B61C 9/38* (2013.01); *H02K 3/04* (2013.01); *H02K 3/51* (2013.01); *H02K 15/0012* (2013.01); *H02K 15/0068* (2013.01); *H02K 17/165* (2013.01)

(58) Field of Classification Search
CPC .......... B23K 1/008; B23K 1/203; H02K 3/51; H02K 3/04; H02K 15/0012; H02K 17/165

USPC ............................................ 74/469; 310/211
See application file for complete search history.

(56) References Cited

U.S. PATENT DOCUMENTS

| 4,131,990 A | * | 1/1979 | Roach | ................ H02K 15/0012 228/185 |
| 4,249,098 A | | 2/1981 | Karlen et al. | |
| 2015/0295483 A1 | * | 10/2015 | Brandl | ..................... H02K 1/26 310/211 |

FOREIGN PATENT DOCUMENTS

KR 100476587 3/2005

* cited by examiner

*Primary Examiner* — Terrance L Kenerly
(74) *Attorney, Agent, or Firm* — Christopher R. Carroll; The Small Patent Law Group LLC

(57) ABSTRACT

A closed socket brazed joint assembly is provided. The assembly comprises: a first member composed of a first base material; a second member composed of a second base material with a first end composed of a first profile with at least first and second faying surfaces; a socket formed in said first member configured to receive the first end of the second member with a faying surface with at least two portions separated by a first fillet; wherein the socket further is configured such that in a first state before the application of energy to the joint there is a gap with a width between the faying surfaces of the first member and the faying surfaces of the second member; and, in the first state a slug of brazing fill material is disposed between the first end of the second member and at least one faying surface of the socket; and, wherein a second state is created when upon application of energy the brazing fill material melts and flows from between first end of the second member and the at least one faying surface of the socket filling aforesaid gap between the faying surfaces of the first and second members.

18 Claims, 4 Drawing Sheets

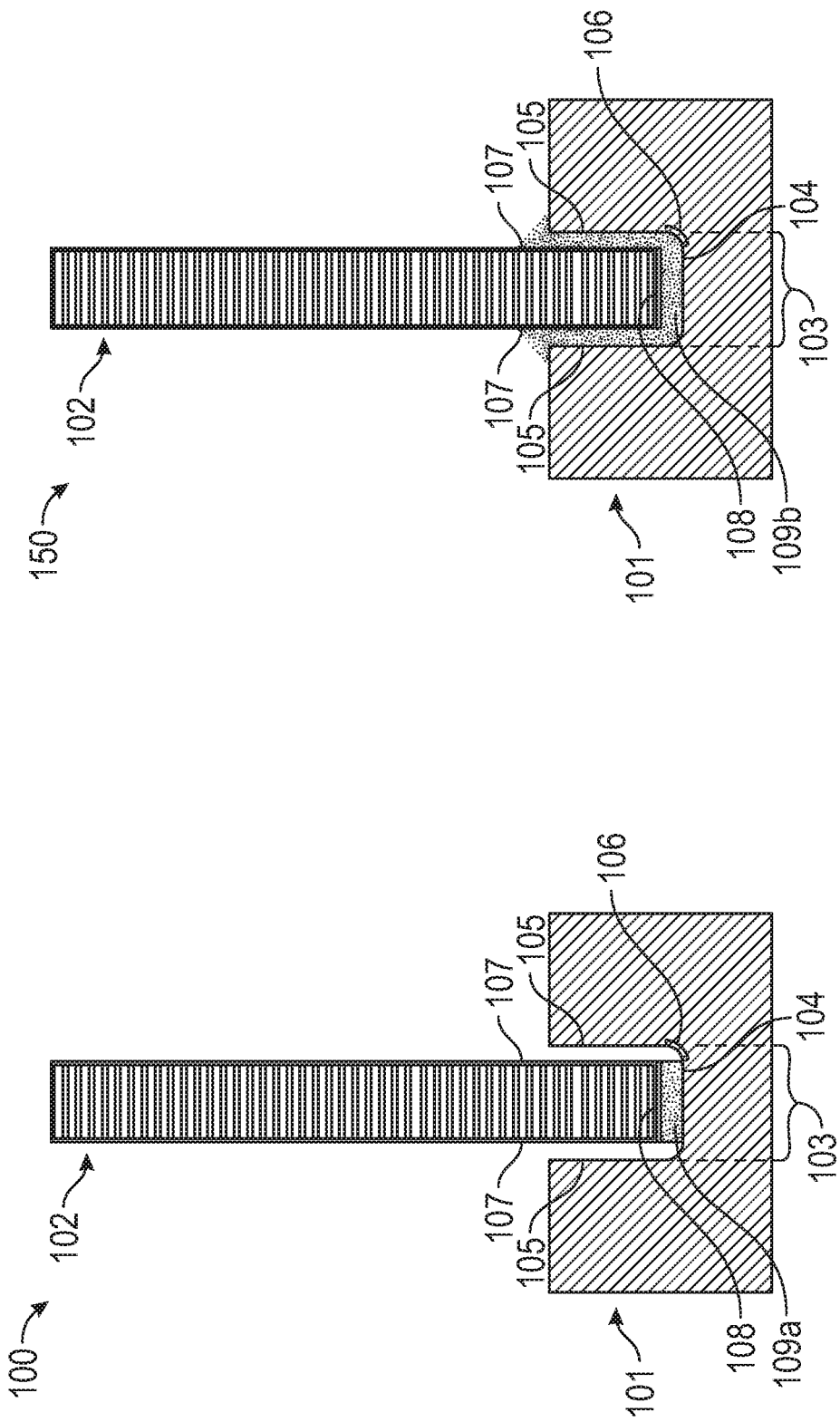

CLOSED SOCKET BRAZED JOINT ASSEMBLY

CROSS-REFERENCE TO RELATED APPLICATIONS

This application is filed concurrently with U.S. Design Application No. 29/676,554, hereby incorporated by reference in its entirety.

BACKGROUND

Technical Field

Embodiments of the invention relate in general to the structure and formation of a closed socket brazed joint. An example of said joint is provided from the construction of rotor components of an induction motor referred to in common as a "squirrel cage motor."

Discussion of Art

Brazing is a technique akin to soldering for joining two pieces of material ("structural members"), composed commonly of metals or metal alloys ("base materials"). In a general sense, brazing is accomplished by heating either the whole or part of the structural members forming a joint to a temperature sufficient to melt a third material ("brazing fill material" or "BFM") that then either wicks, flows, or utilizes capillary action to fill a gap between overlapping or adjoining surfaces of the two pieces (termed "faying surfaces"), thus joining the base materials.

The technique differs from welding in that the base materials are not melted or fused together to join the structural members together. Instead, the finished strength of the final joint derives from how well the BFM flows or wicks into the gap between the base materials, evenly contacting the faying surfaces, and solidifies. Common steps in the brazing process can include: cleaning the faying surfaces of the structural members that will be joined; placing the faying surfaces of the structural members into the proper alignment and orientation; heating the base materials; applying flux; applying BFM; cooling the joint; and, cleaning the joint. Practitioners in the art can appreciate that any individual process may contain some, all, or additional steps and that the order of operations may vary to each specific process.

Common brazing methods can include:
  Torch brazing, in which the heat required to melt the BFM is supplied by a fuel gas flame. The fuel gas can be at least one of acetylene, hydrogen, or propane that is combined with oxygen or air to form a flame.
  Induction brazing, in which the high frequency oscillation of a nearby electrical current coupled with the subsequent oscillating magnetic field induces heat buildup in the base materials.
  Resistance brazing, in which heat is generated from resistance to an electrical current flowing in a circuit that includes the joint.
  Furnace brazing, in which the joint is placed in a furnace and heated (with or without atmospheric control).
  Finally, dip brazing involves immersion of the entire joint into a bath of molten BFM and/or flux; in both cases the bath temperature is below the melting point of the base materials but above the melting point of the BFM and/or flux.

The presence of dirt and debris coupled with the formation of oxides formed on the faying surfaces during the heating stages can weaken final joint strength. A material termed "flux" is applied to the faying surfaces of the base materials in order to prevent oxides from forming when the base materials are heated and BFM flows into the joint. Thus, a flux flows into, or is already present in, the joint when heat is applied, and is subsequently displaced by BFM. Flux may also serve the purpose of chemically cleaning any contaminants left on the faying surfaces after an initial cleaning step. Made of numerous materials, flux is available in at least: pastes, liquids, semi-solids, putties, or powders. Composite materials may also combine flux with BFM. Flux can also be applied using brazing rods with a coating of flux or a flux core. In an ideal joint BFM completely displaces flux from the joint, as flux, and any impurities held by the flux, left in the joint can at least: corrode the joint, impede joint inspection, limit or impede further process steps (such as surface finishing), decrease desired properties in the joint (i.e., electrical conductivity, chemical properties), and weaken overall joint strength. Thus, there is need for brazed joints that maximize BFM infiltration and flux exfiltration.

Common brazing joints can include: butt-joints (the faying surfaces are the ends of continuous structural members, such as joining two sheets or rod ends together); lap joints (the faying surfaces are overlapped instead of end-to-end); perpendicular butt joints (the faying surfaces constitute the end of a base material attached to the non-parallel side of another base material, such as the end of a rod to the surface of a sheet); tube-through-plate (wherein the faying surfaces are the sidewall of a tube and the surface of a sheet forming the hole through which the tube passes); and socket-joints (wherein the faying surfaces are formed from the end of one piece of a structural member inserted into a complementary socket). These basic joint types can be combined to form more complex joints; for example, a tube-through-plate that incorporates lap joints to increase the faying surface area. Overlap of faying surfaces, particularly for lap and angled butt joints, is typically designed to fall in the range of 3-to-4 T (6 T max), where "T" is the thickness of the thinner base material. Socket joint design requires the consideration of additional factors.

Socket joints may be either closed or open. A typical socket joint of either type may be formed by: fluxing the faying surfaces, inserting one end of a structural member made of a first base material into a socket formed in a structural member composed of a second base material, placing a ring of BFM wire around the joint opening, heating the faying surfaces which melts the ring of BFM wire, allowing the BFM to flow into the joint, cooling the joint, and cleaning the joint. In an alternative process, an end of BFM wire may be placed at the opening of a heated joint, the end is then moved around the opening perimeter allowing BFM to wick into and complete the joint. Whether performed by automation or by hand, both techniques display high variance in the overall quality of the finished joint. For example, BFM may not fully fill the joint, and flux or other materials may remain trapped within the joint. Amongst many factors (e.g., skill of the practitioner, joint geometry, joint materials, etc.), the displayed variance can also be attributed to poor movement of trapped gasses and flux material from the joint interior.

In addition to flux displacement as BFM flows into the joint from the socket opening, socket joints must also account for the venting of heated gases formed in the joint when the base materials are heated (i.e.: when base materials off-gas from heating, the secondary heating of gases in the joint space due to the heated base materials), flux material is vaporized or liquified, or there is off-gassing from the BFM.

In an open socket design a drain hole is located in the socket to facilitate the exfiltration of flux and gases during BFM infiltration. In addition to adding complexity to the manufacture of the joint, the addition of a hole to create an open socket is not always possible.

In similar fashion for a closed socket, the creation of a flux well (an indentation, concavity, or other space designed to allow displaced flux to gather when displaced by BFM) increases manufacturing complexity. Such a formation is further disadvantaged by decreasing the available faying surface area and increasing the likelihood of corrosion formation in the joint due to trapped impurities in the captured flux or just the flux itself. Thus, there is need for a socket that: maximizes faying surface area, minimizes manufacturing complexity, maximizes gas venting, and maximizes flux exfiltration.

Since brazed joints rely on capillary flow of BFM into the joint, tolerances can be calculated to maintain a clearance between faying surfaces that allows for the most effective capillary action. If the clearance is too narrow, BFM cannot flow into the joint in a fashion that allows for optimal distribution and an even coating across the faying surfaces, weakening the joint. In the alternative, if the tolerances are too wide the strength of the joint will be reduced almost to that of the BFM. Also, the larger gap reduces capillary action resulting in BFM failing to fully penetrate the joint, further weakening the joint. Since brazing often occurs at elevated temperatures, joint design can account for various coefficients of thermal expansion for the base materials so that ideal tolerances are maintained at brazing process temperatures. When heating complex assemblies with multiple structural members and multiple brazed joints, either in uniform or in sectional application, heat and/or vibrational induced movement in the assembly may move associated structural members ready to be brazed and their faying surfaces out of tolerance prior to final joint formation. Thus, there is need for a brazed joint that may maintain the clearance tolerances of constituent pieces prior to the formation of a completed joint.

Many induction motor rotors, and particularly those adapted for use in large size machines, feature a squirrel cage winding. In a squirrel cage winding, preformed conductor bars span across the rotor core with conductive annular end rings interconnected, both in electrical and mechanical fashion, to extensions of the bars at opposite ends of the core. The result is the well-known winding structure from which the descriptive name "squirrel cage" is derived. In this example the conductor bars and annular rings are structural members composed of base materials with multiple joints forming a complex assembly.

Four types of joint demonstrate some common means of accomplishing the interconnection of the conductor bars to the conductive annular rings: a butt joint between the end face of a conductor bar and the adjoining flat face of an annular ring; a lap joint wherein a conductor bar is seated into a circumferentially placed, radially extending slot cut into the annular ring; a lap joint wherein a long axis surface of the conductor bar is positioned atop a proportionally sized surface of the annular ring; finally, a butt joint formed by inserting the end face of a conductor bar into a circular groove inscribed into a face of an annular ring. Practitioners in the art can appreciate that none of the techniques listed above secure all faces of the faying surface of a conductor bar end to the annular ring; at most, for a bar with a rectangular profile, three faces are in contact with the annular ring resulting in a weaker joint than if all faces, and hence all of the available faying surface, was connected. In the case of the annular-groove joint, BFM may not fully wick into and fill the gap between the groove wall and the conductor bar face despite proper tolerances. Further, the efficient transfer of electrical energy relies on minimizing the amount of material at the interface of the faying surfaces while maximizing the overall surface area of the connection. Thus, there is need for a joint that maximizes conductive transfer and mechanical strength while minimizing the usage of connective material.

BRIEF SUMMARY OF THE INVENTION

In an embodiment, a closed socket brazed joint assembly is provided. The assembly includes: a first member composed of a first base material; a second member composed of a second base material with a first end composed of a first profile with at least first and second faying surfaces; a socket formed in said first member configured to receive the first end of the second member with a faying surface with at least two portions separated by a first fillet; wherein the socket further is configured such that in a first state before the application of energy to the joint there is a gap with a width between the faying surfaces of the first member and the faying surfaces of the second member; and, in the first state a slug of brazing fill material is disposed between the first end of the second member and at least one faying surface of the socket; and, wherein a second state is created when upon application of energy the brazing fill material melts and flows from between first end of the second member and the at least one faying surface of the socket filling aforesaid gap between the faying surfaces of the first and second members.

In another embodiment, a brazed joint assembly is provided. The assembly includes: at least one closed socket brazed joint with at least first and second members with respective faying surfaces; at least one indexed closed socket brazed joint with at least first and second members and at least one index guide; wherein the at least one index guide of the at least one indexed closed socket brazing joint is configured to align the faying surfaces of the at least first and second members of the at least one closed socket brazed joint.

In another embodiment, there is provided a method for the assembly of a closed socket brazed joint. The method comprises: providing a first member composed of a first base material; providing a second member composed of a second base material with a first end composed of a first profile with at least first and second faying surfaces; forming in a first member at least one socket configured to receive the first end of the second member with a faying surface with at least two portions separated by a fillet the radius of which is at least equal to the distance between the faying surfaces of the first and second members; providing a slug of brazing fill material substantially in conformation with the first profile of the first end of the second member; placing the slug of brazing fill material in the socket formed in the first member; placing the first end of the second member into the socket of the first member, trapping the slug of brazing fill material; applying energy to the base materials of at least one of the first and second members; and, melting the brazing fill material.

In another embodiment, there is provided an apparatus comprising a first member having a first surface. The first member defines a closed socket formed into the first surface, the socket defined by plural faying surfaces, the plural faying surfaces including a peripheral sidewall and a floor. The peripheral sidewall extends from the first surface of the first member and terminates at the floor, the floor and the first surface not intersectional with each other. The peripheral sidewall is transitioned to the floor by a fillet. The socket is dimensioned to receive an end of a second member, the second member having plural faying surfaces for joining the second member to the first member.

BRIEF DESCRIPTION OF THE DRAWINGS

Features and advantages of embodiments of the present invention will become apparent on reading the detailed description below with reference to the drawings, which are illustrative but non-limiting, wherein:

FIGS. 1A and 1B illustrate cross sectional schematic views of closed socket brazed joint assemblies before (FIG. 1A) and after (FIG. 1B) heat application according to an embodiment of the invention;

DETAILED DESCRIPTION OF THE INVENTION

Figure 2A:
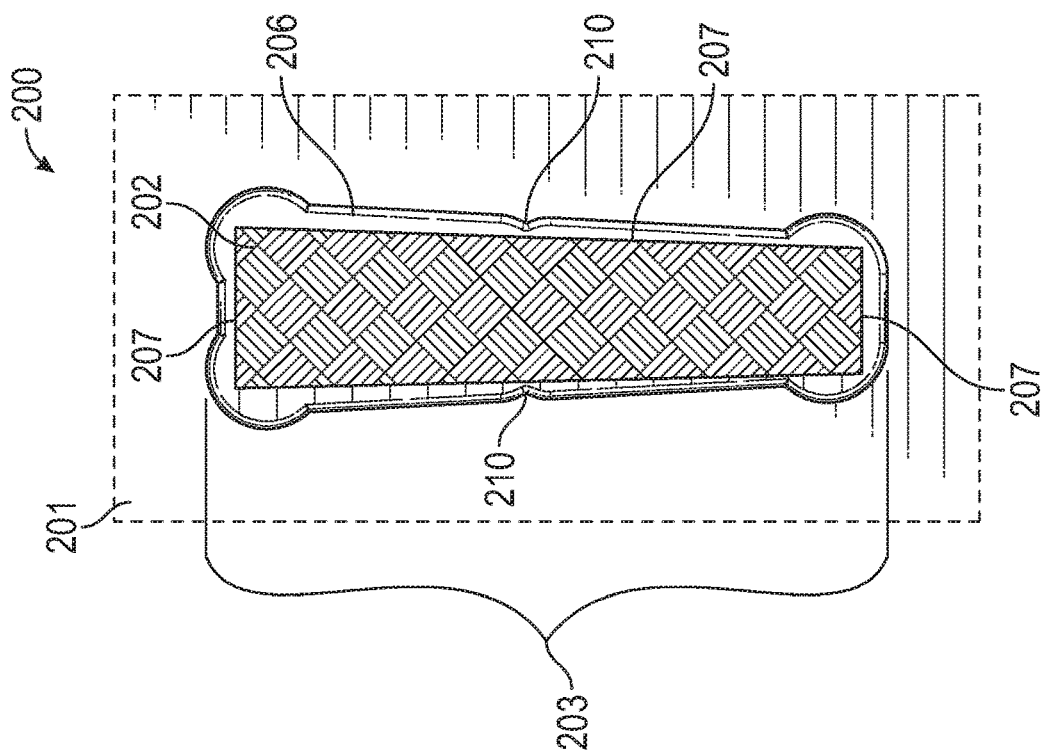
FIG. 2A is a perspective view of a first structural member made of a first base material with a socket formed in the member configured for the formation of an indexed closed socket brazed joint assembly according to an embodiment of the invention.

Reference will be made below in detail to exemplary embodiments of the invention, examples of which are illustrated in the accompanying drawings. Wherever possible, the same reference characters and/or numbers used throughout the drawings refer to the same or like parts, without duplicative description.

While embodiments disclosed herein are described with respect to the construction of an indexed closed socket brazed joint for the joining of conductor bars to an annular ring as part of an inductive motor rotor assembly, it is to be understood that embodiments of the present invention may be applicable to other types brazed assemblies requiring the use of a closed socket type joint. More specifically, practitioners in the art will readily recognize that embodiments may be suitable for use with closed socket joints that are soldered or welded. Practitioners may also appreciate that certain, embodiments may be utilized for joining procedures requiring flow of a fill material, at any temperature, using mechanical or capillary means to flow the fill material, into a close-ended socket joint.

As used herein, the terms "substantially," "generally," and "about" indicate conditions within reasonably achievable manufacturing and assembly tolerances, relative to ideal desired conditions suitable for achieving the functional purpose of a component or assembly.

As used herein the term "structural member" or "member" refers to a part or a piece that will be joined to another part or piece. Often structural members are composed of one or more base materials with the same or varying coefficients of thermal expansion and the same or different mechanical and chemical properties.

As used herein the terms "base materials" or "base metals" refer to the composition of the structural members interconnected by the brazed joint. The base materials may be of the same or different composition from each other with the same or varying coefficients of thermal expansion. In practice the base materials have a melting temperature different from the BFM.

As used herein the terms "floor" and "wall" (singular or plural) are used in conjunction with the description of the faying surfaces within a socket and are not meant to connote a specific orientation of a final joint or assembly of joints. In essence, the terms help to differentiate the locations of different portions of the overall faying surface available in a socket relative to each other. It is understood that a socket may have one overall faying surface, the portions of which are subdivided and named. Likewise, the end of a structural member with a profile complementary to the socket may be said to consist of a single faying surface subdivided into identifiable portions.

The term "socket" is defined as a space with faying surfaces formed in the base material of a structural member or members of a joint assembly. A socket can also be formed by the joining together of two or more structural members in order to accept the positioning of an n+1 member into the joint assembly. Or, in an alternative, a socket may be formed in the base material of a single structural member to accommodate the faying surfaces of one or more structural members forming the joint. As noted above, an "open socket" contains a hole that allows for the venting of flux and gasses during the formation of a brazed joint whereas a "closed socket" does not.

As used herein the term "indexing guide" refers to a configuration of the socket wall that align and/or orient the faying surfaces of the first member and the second member. An indexing guide may be formed from the same base material as the first member or may be formed from one or more additional materials. For example, the indexing guide may be formed by a piece of flux material that then vaporizes upon completion of joint formation. The indexing guide may also be integral with the faying surface of the first member. An indexing guide may have a simple shape with a first surface, a contact surface, and a second surface. The guide may also be integrated into the first faying surface. An indexing guide may also be formed as part of other structural features. For example, the transitional ends of a fillet may be further refined to serve as guides either by virtue of placement or by further modification into a more complex shape.

FIGS. 1A and 1B present two cross-sectional schematic views of a closed socket brazed joint assembly before heat application 100 (FIG. 1A) and after heat application 150 (FIG. 1B). Seen in FIGS. 1A and 1B, the joint assembly comprises a first member 101 and a second member 102, both composed of respective base materials. A socket 103 is formed in first member 101. Socket 103 comprises floor 104 and side walls 105 that comprise portions of the overall faying surface available in the socket. Fillet 106 forms the connection between floor 104 and side walls 105. Those skilled in the art can appreciate that fillet cut 106 can also be a chamfer cut with similar properties. Second member 102 contains faying surfaces 107 substantially in conformation with side walls 105 and faying surface 108 which is substantially in conformation with floor 104. A slug of BFM 109*a* substantially in conformation with the profile of faying surface 108 and floor 104 is placed between faying surface 108 and floor 104. After the application of heat, BFM 109*b* has filled the joint, coating the faying surfaces and completing the interconnection of first member 101 and second member 102.

For the illustrated assembly in FIG. 1A and FIG. 1B, the clearance between faying surfaces 107 and side walls 105 is targeted at 0.015 inches with a range of 0.006-0.020 inches. Fillet 106 has a target radius of 0.015 inches and a range of 0.010-0.020 inches. Practitioners in the art will recognize that these clearances may be adapted to their particular geometry for socket 103 and faying surfaces 107 in addition to accounting for the coefficients of thermal expansion for the base materials of first member 101 and second member 102.

In order to minimize any trapped gasses, BFM slug 109*a* can be equal or slightly larger in shape to faying surface 108 of second member 102. The volume of BFM slug 109*a* ($V_{109a}$) is the volume of the socket 103 ($V_{103}$) less the volume of the portion of second member 102 ($V_{102}$) in socket 103 multiplied by a factor of two. Thus, $V_{109a} = (V_{103} - V_{102}) \times 2$ with the target value for $V_{109a}$ set at 2 and a range of 1.8 to 2.2 units of volume. Practitioners can readily appreciate that volume has many units of measure and that the units may be scaled appropriately to the process and parts in a particular application. Practitioners can recognize that once a volume is determined, a mass for BFM slug 109*a* may be calculated and used in practice.

Flux material may be applied directly to faying surfaces 104, 105, and 107 before initial joint assembly. In the alternative, flux material may be present as part of BFM slug 109*a* or it may be formed into separate single or multiple slugs placed between faying surface 108 and slug 109*a* and slug 109*a* and faying surface 104.

When heat is applied BFM slug 109*a* melts and moves up via capillary action from between faying surfaces 108 and 104 up into the gap between faying surfaces 105 and 107 filling the joint with BFM 109*b* (FIG. 1B) and completing the assembly 150. Without subscribing to any particular theory, it is believed that fillet 106 facilitates the escape of flux and trapped gasses and enhances the capillary movement of BFM permitting filling of the joint and contact with all faying surfaces.

Without subscribing to any particular theory or limiting to a single order of operations (the order and composition of which may be changed on a per-joint basis), an indexed closed socket brazed joint assembly may be formed by: In a first member composed of a first base material, forming a socket with faying surfaces in negative profile with the faying surfaces of a second member composed of a second base material, the interface of the floor and walls of the socket formed by a fillet cut with a radius equal or greater to the clearance gap between the wall faying surfaces and the faying surfaces of the second member; placing a slug of BFM substantially in conformation with the profile of the socket-floor-facing faying surface of the second member with a volume within the range of 1.8 to 2.2 of the volume of the socket less the volume of the second member in the socket multiplied by two into the socket; inserting the second member into the socket formed in the first member; applying energy resulting in heat to the structural members in whole or in part melting the BFM slug; applying heat energy for some or all of the time required for the BFM to fill the joint; removing the energy source; allowing the finalized joint assembly to cool. In an alternative form, the BFM slug may first be attached to the end of the second member, via flux, paste, or other means, prior to socket insertion and joint completion.

Figure 2B:
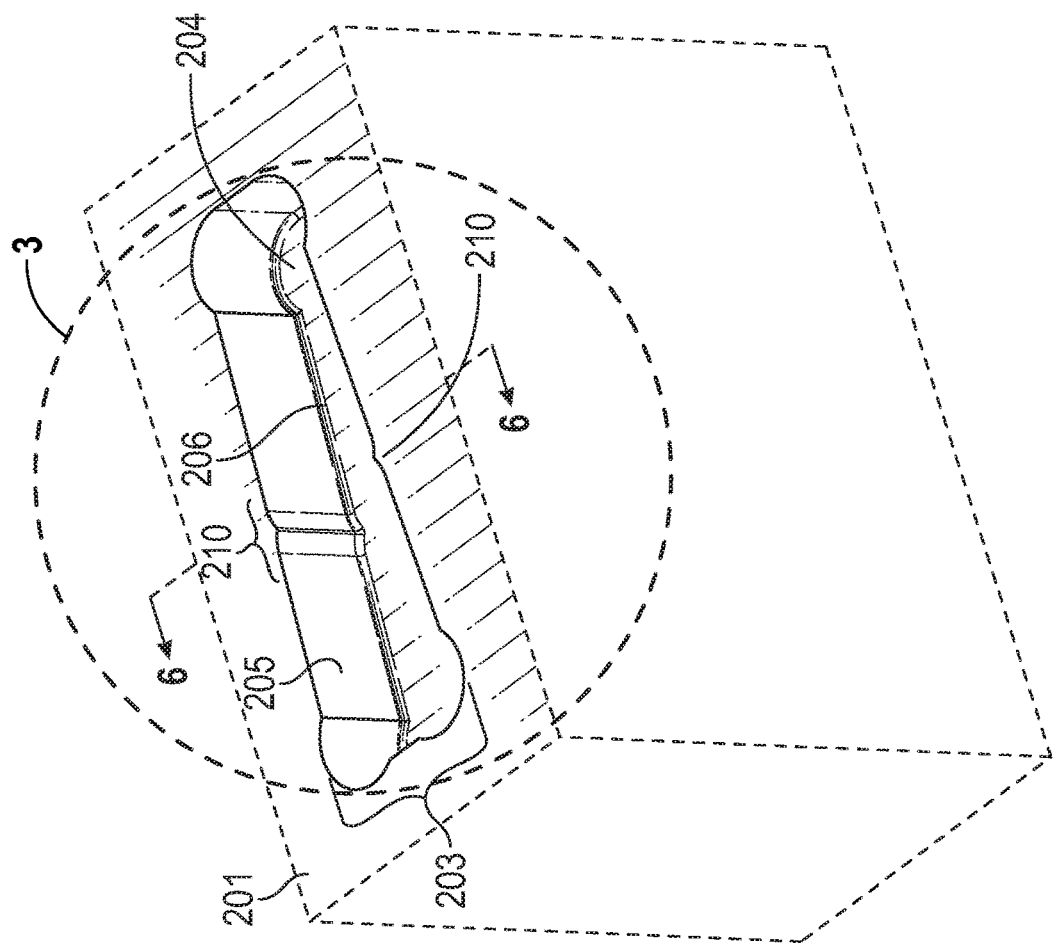
FIG. 2B is an overhead view of an indexed closed socket brazed joint assembly before heat application according to an embodiment of the invention.

FIG. 2A shows a perspective view of a structural member with a socket 203 for the formation of an indexed closed socket brazed joint assembly according to an embodiment of the present invention; and FIG. 2B which shows an overhead view an indexed closed socket brazed joint assembly before heat application 200. Visible in both FIGS. 2A and 2B is: first member 201 with socket 203, fillet 206 joining faying surface walls 205 to floor faying surface 204, and indexing guides 210. FIG. 2B further illustrates second member 202 with wall faying surfaces 207 positioned in socket 203.

Indexing guides 210 align the faying surfaces of member 202 with faying surfaces 204 and 205 of socket 203. In this instance, indexing guides 210 have a target clearance of 0.002 in from faying surface 207 of second member 202 and center second member 202 along the longitudinal axis of the joint. Indexing guides in this instance are designed to have minimal impact on the overall available faying surface available in the joint. Practitioners in the art can recognize that, although two indexing guides 210 are demonstrated here, for some geometries only one guide may be necessary or, in others, three or more. Tolerances, geometry, and final sizing may also be adjusted to account for various coefficients of thermal expansion and final joint strength requirements. In some instances, indexing guides 210 may be formed to increase available faying surface area (i.e., a tongue-and-groove alignment, indexed tabs, etc. not shown).

In an assembly utilizing multiple closed socket brazed joints, one or more sockets may contain indexing guides 210. For example, in the construction of the aforementioned squirrel cage rotor assembly, multiple conductor bars may be interconnected with the conductive annular rings using multiple joints. A socket similar to socket 203 with indexing guides similar to indexing guides 210 may be formed in three separate locations on the annular ring spaced 120° apart. Subsequent sockets similar to socket 103, which is absent indexing guides 210, may then be spaced in accordance with the number of conductor bars required. The multiple joints are thus indexed by the three sockets similar to socket 203 and may be brazed either singly, all at once, or in multiple groups.

Figure 3:
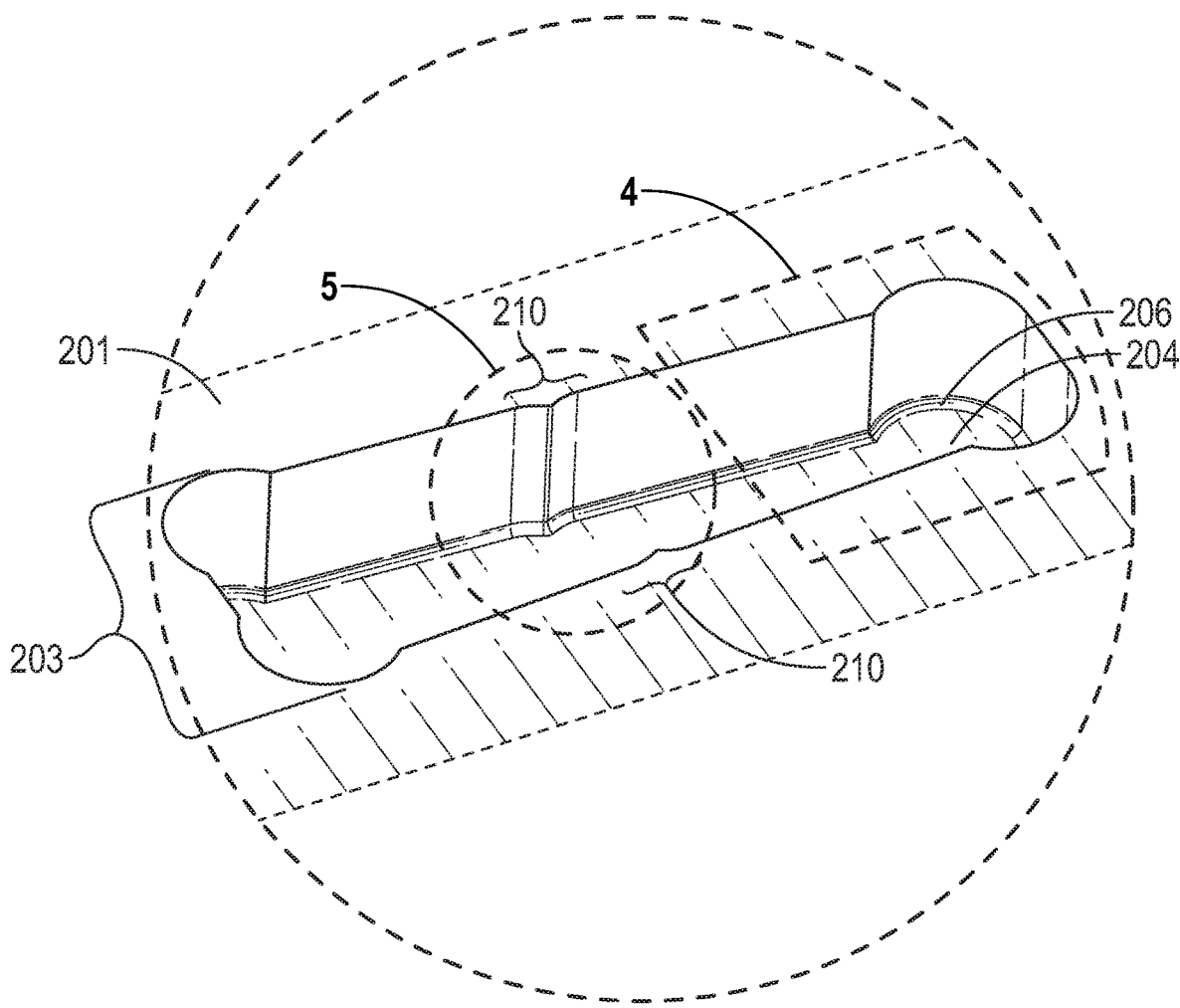
FIG. 3 is a detail second perspective view of a first structural member made of a first base material with a socket formed in the member configured for the formation of an indexed closed socket brazed joint assembly according to an embodiment of the invention as set off by the dashed circle in FIG. 2A.

FIG. 3 illustrates a detail second perspective view of a first member formed with a socket 203 for the formation of an indexed closed socket brazed joint assembly according to an embodiment of the present invention as set off by the dashed circle in FIG. 2A. The view is otherwise identical to that of FIG. 2A with all features present and serves to highlight the locations of detail views illustrated in FIGS. 4 and 5.

Figure 4:
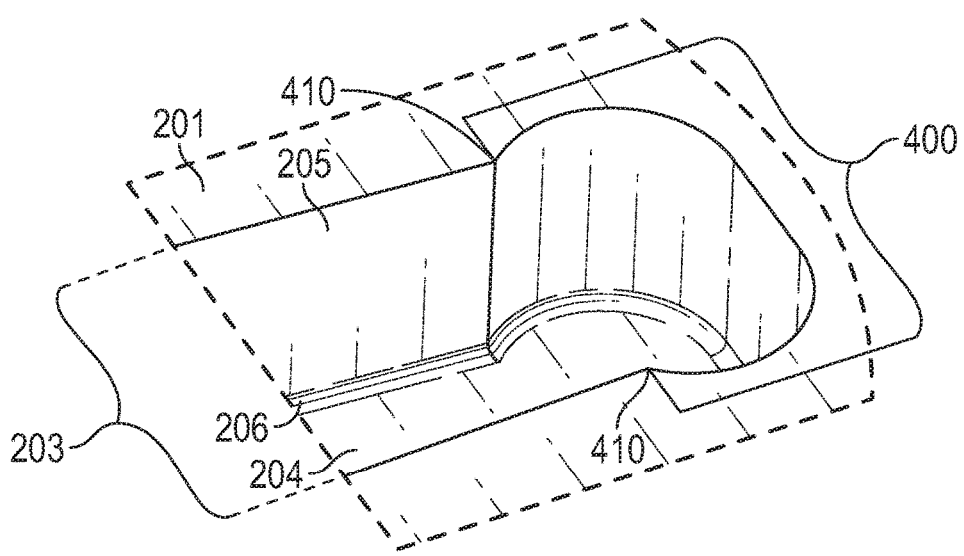
FIG. 4 is a detail view of the end of the socket of FIG. 3 according to an embodiment of the invention as set off by the dashed box in FIG. 3 thereof.

FIG. 4 shows a detail view of one end of socket 203 of FIG. 3 and FIG. 2A according to an embodiment of the present invention as set off by the dashed box in FIG. 3. Visible are: the surface of first member 201, floor faying surface 204, wall faying surface 205, and fillet 206. As illustrated in FIG. 2B the tapered end of second member 202 with faying surfaces 207 interfaces with faying surfaces of filleted end 400 defined by the curvature between endpoints 410. As illustrated in FIG. 2B the radius of the curves of filleted end 400 are defined such that the gap between faying surfaces 205 and 207 are in the range of 0.006-0.020 in with a target clearance of 0.015 in. Without subscribing to any particular theory, it is believed that filleted end 400 works with fillet 206 to provide additional space for gas and flux exfiltration during heat application and joint formation. Further, the geometry of endpoints 410 may be altered such that they serve the function of indexing guides 210, with similar tolerances with the interface of faying surface 207, simplifying the machining required.

Figure 5:
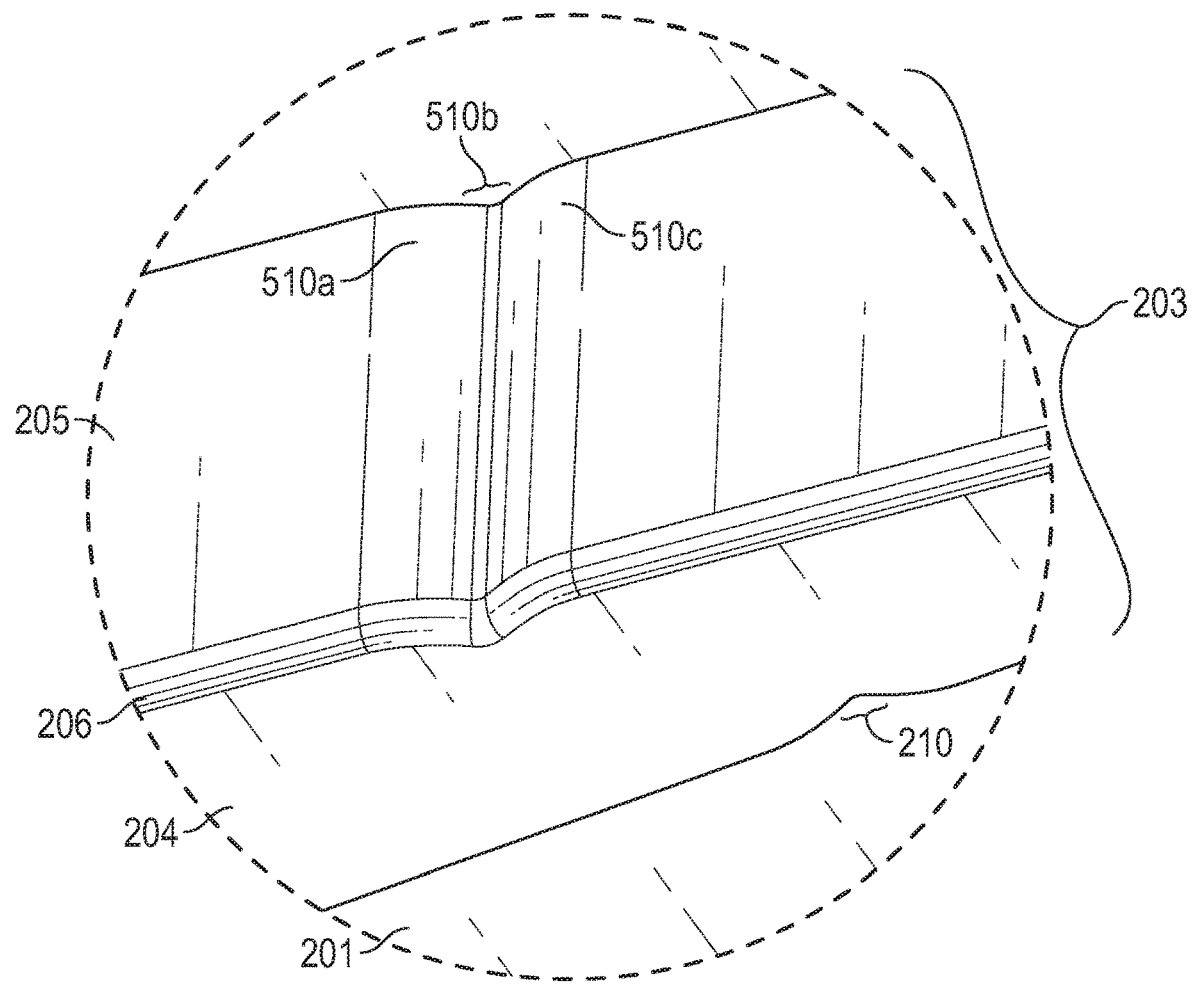
FIG. 5 is a detail view of the socket of FIG. 3 according to an embodiment of the invention as set off by the dashed circle in FIG. 3 thereof; and, FIG. 6 is a cross sectional view of a first member composed of a first base material with a socket for the formation of a closed socket brazed joint assembly according to an embodiment of the invention across the section line as set off in FIG. 2 thereof.

FIG. 5 illustrates a detail view of socket 203 of FIG. 3 according to an embodiment of the present invention as set off by the dashed circle in FIG. 3. Visible are: the surface of first member 201, floor faying surface 204, wall faying surface 205, and fillet 206. Further detail of indexing guides 210 is presented. Indexing guide 210 is comprised of first surface 510a, contact surface 510b, and second surface 510c. Contact surface 510b is designed to come in contact with faying surface 207 of second member 202. As illustrated and described above this embodiment has a clearance of 0.002 in or less between contact surface 510b and faying surface 207.

Those skilled in the art can appreciate that the width and shape of contact surface 510b can be altered to provide suitable guidance and positioning for second member 202. For example, the upper portion of contact surface 510b may be tapered to allow an off-position part to self-guide back into place (not shown). In addition, some or all, of indexing guide 210 may be composed of a third base material (such as wax, solder, salts, etc.), BFM, or flux. Thus, in an alternative embodiment, the formation of an indexed closed socket brazed joint assembly may include the steps of depositing and forming material in socket 103 as an indexing guide. Upon heating and joint formation, the material may, melt, vaporize, solubilize (in liquid flux for example), or otherwise be removed from the joint.

Figure 6:
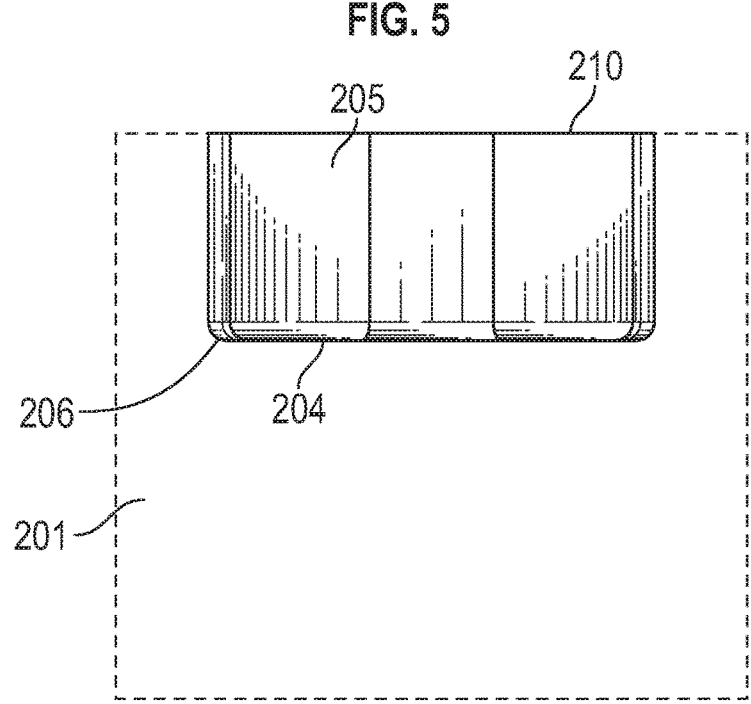

Finally, FIG. 6 shows a cross sectional view of first member 201 with socket 203 for the formation of an indexed closed socket brazed joint assembly according to an embodiment of the present invention across the section line as set off in FIG. 2 thereof. Visible are: a cross section of first member 201, floor faying surface 204, wall faying surface 205, fillet 206, and profile of indexing guides 210. In applications, practitioners may vary the overall height of walls 205 in accordance with the desired mechanical requirements of the joint and the properties of the base materials comprising the members in the joint.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment a closed socket brazed joint may comprise: a first member, a second member with a first end having a first profile with at least first and second faying surfaces; and, a socket formed in said first member configured to receive the first end of the second member. The socket formed in the first member such that in a first state before the application of energy to the joint there is a gap with a width between the faying surfaces of the first member and the faying surfaces of the second member. Also in the first state, a slug of brazing fill material is disposed between the first end of the second member and at least one of the faying surfaces of the socket. A second state is created when energy is applied to the assembly, melting the brazing fill material which flows from between the first end of the second member and at least one of the faying surfaces of the socket filling the gap between the faying surfaces of the first and second member. In the first state, a slug of flux material may be disposed between at least one of: the first end of the second member and the slug of brazing fill material; or between the slug of brazing fill material and the at least one of the faying surfaces of the socket. The first fillet may also have a radius at least equal to the width of the gap between the faying surfaces of the first member and the faying surfaces of the second member in the first state.

An additional fillet may be formed in the wall faying surface of the socket at locations that correspond to a change in the profile of the second faying surface of the second member. The additional fillet may also have a radius at least equal to the width of the gap between the faying surfaces of the first member and the faying surfaces of the second member in the first state. The change in profile of the second faying surface of the second member may also be mirrored by the shape of the first faying surface of the second member. The profile change may consist of acute angle changes, curves, or any change that would otherwise vary the width of the gap between the wall faying surface of the socket and the second faying surface of the second member.

In an embodiment of a closed socket brazed joint end points defining the boundaries of the one additional fillet may be extended to form indexing guides configured to position the faying surfaces of the first member with the faying surfaces of the second member. The endpoints may be further modified into more complex shapes to support the indexing function.

In another embodiment, the first member comprises an annular ring and the second member comprises a conductor bar.

In another embodiment, the volume of the brazing fill material slug is equal to the volume of the socket less a volume of the portion of the first end of the second member in the socket multiplied by a factor of two. The volume of the brazing fill material slug may also be within the range of 1.8-2.2 units of volume. Practitioners in the art can recognize that a suitable mass of brazing fill material may be used once the volume is calculated.

In another embodiment, an indexing guide is configured to position the faying surfaces of the second member in a pre-determined alignment with the faying surfaces of the socket of the first member, forming an indexed closed socket brazed joint. The indexing guide may be comprised of at least one of: a first surface, a contact surface, or a second surface. The contact surface may be further configured to self-align the faying surfaces of the second member, thus preventing the mis-alignment of the faying surfaces of the first end of the second member with the faying surfaces of the socket formed in the first member. The indexing guide may also be composed from at least one of: brazing fill material, flux, and/or material that vaporizes upon joint formation. The indexing guide may be further configured to increase available faying surface area.

In another embodiment a brazed joint assembly may comprise at least one closed socket brazed joint with at least first and second members with respective faying surfaces; and at least one indexed closed socket brazed joint with at least first and second members and at least one index guide. The at least one index guide of the at least one indexed closed socket brazed joint is configured to align the faying surfaces of the at least first and second members of the at least one closed socket brazed joint. At least one member may be an annular ring and at least one member may be a conductor bar. The annular ring may also have at least three indexed closed socket brazed joints at 120° with respect to a center axis of the annular ring.

In another embodiment, a closed socket brazed joint may be formed following steps that comprise: providing a first member composed of a first base material; providing a second member composed of a second base material with a first end comprised of a first profile with at least first and second faying surfaces; forming in the first member a socket having plural faying surfaces with at least two portions separated by a fillet, the socket configured to receive the first end of the second member, wherein a radius of the fillet is at least equal to a distance between the faying surfaces of the first and second members when the first end of the second member is disposed in the socket; placing a slug of brazing fill material in the socket formed in the first member the slug of brazing fill material substantially in conformation with the first profile of the first end of the second member; placing the first end of the second member into the socket of the first member, trapping the slog of brazing fill material; applying energy to at least one of the first base material of the first member or the second base material of the second member; and, melting the brazing fill material. The volume of the brazing fill material may also be calculated as equal to a volume of the socket formed in the first member less a volume of the portion of the first end of the second member in the socket multiplied by a factor of two, wherein the slug of brazing fill material that is provided has a volume corresponding to the volume that is calculated. Also, the method may further comprise in the socket formed in the first member, forming an indexing guide configured to position the faying surfaces of the second member in a pre-determined alignment with the faying surfaces of the socket formed in the first member.

In another embodiment an apparatus comprises a first member having a first surface. The first member defines a closed socket formed into the first surface, the socket defined by plural faying surfaces, the plural faying surfaces including a peripheral sidewall and a floor. The peripheral sidewall extends from the first surface of the first member and terminates at the floor, the floor and the first surface being spatially independent surfaces. The peripheral sidewall is transitioned to the floor by a fillet. The socket is dimensioned to receive an end of a second member, the second member having plural faying surfaces for joining the second member to the first member. The peripheral sidewall may define plural indexing guides the indexing guides configured to position faying surfaces of the end of the second member in a pre-determined alignment with the faying surfaces of the socket for forming an indexed closed socket brazed joint. The fillet has a radius corresponding to a width of a distance between the sidewall and one or more of the faying surfaces of the end of the second member that are closest to the sidewall when the end of the second member is fully disposed in the socket. The fillet may also extend along partial portion of a junction between the floor and the peripheral wall. It may, for example, be interrupted by the presence of an indexing guide or a change in the geometry of the peripheral wall. In the above embodiment it is also possible that the sidewall includes a first pair of co-planar wall portions; and the sidewall includes a first indexing guide, the first indexing guide having a long axis oriented at the perpendicular or near-perpendicular angle and a transverse axis defining a depth of the first indexing guide, the first indexing guide protruding out from the first pair of co-planar wall portions towards a center of the socket, and the first indexing guide having a first surface, a contact surface, and a second surface, the first surface transitioning from one of the first pair of co-planar wall portions to the contact surface, and the second surface transitioning from the contact surface to the other of the first pair of co-planar walls, the contact surface aligned with the long axis of the first indexing guide. In addition, it may also be possible that the sidewall includes a second pair of co-planar wall portions; and the sidewall includes a second indexing guide, the second indexing guide having a long axis oriented at the perpendicular or near-perpendicular angle and a transverse axis defining a depth of the second indexing guide, the second indexing guide protruding out from the second pair of co-planar wall portions towards the center of the socket, and the second indexing guide having a first surface, a contact surface, and a second surface, the first surface of the second indexing guide transitioning from one of the second pair of co-planar wall portions to the contact surface of the second indexing guide, and the second surface of the second indexing guide transitioning from the contact surface of the second indexing guide to the other of the second pair of co-planar walls, the contact surface of the second indexing guide aligned with the long axis of the second indexing guide, wherein the first indexing guide is located on a first side of the socket and the second indexing guide is located on a second side of the socket opposite the first indexing guide.

In the embodiment of the apparatus above, it is further possible that the peripheral sidewall defines plural indexing guides protruding inwards toward a center of the socket, the indexing guides configured to position faying surfaces of the end of the second member in a pre-determined alignment with the faying surfaces of the socket, for forming an indexed closed socket brazed joint; the fillet has a radius corresponding a width of a distance between the sidewall and one or more of the faying surfaces of the end of the second member that are closest to the sidewall when the end of the second member is fully disposed in the socket; and the socket is elongate and has a length that is greater than a width of the socket and a depth of the socket, and the fillet extends along an entirety of a junction between the floor and the peripheral wall, and the peripheral wall at a first distal end of the socket is rounded to form a filleted end and the peripheral wall at a second distal end of the socket includes two adjacent, rounded lobe portions.

Another embodiment can include a motor comprising the apparatus described above, wherein the first member is a metallic, annular end ring; and the second member, wherein the end of the second member is disposed in the socket, the second member comprising a conductor bar; wherein the conductor bar is attached to the annular end ring by a brazed joint, the brazed joint comprising an interface between material of the annular end ring that defines the socket, the end of the second member, and brazing fill material disposed between the sidewall and conductor bar.

Finally, a method of manufacturing a part may comprise: providing the first member and the second member of the embodiment described immediately above; placing a slug of brazing fill material in the socket; placing the first end of the second member into the socket, trapping the slug of brazing fill material; applying energy to at least one of the first member or the second member; and melting the brazing fill material.

In an embodiment, a closed socket brazed joint (e.g., for a locomotive traction motor, other motor, or other metal joining application) includes a first member and a second member. The second member has a first end having a first profile with at least first and second faying surfaces. A socket is formed in the first member and configured to receive the first end of the second member. The socket has faying surfaces with at least two portions separated by a first fillet. The socket further is configured such that in a first state before the application of energy to the joint there is a gap with a width between the faying surfaces of the first member and the faying surfaces of the second member. In the first state a slug of brazing fill material is disposed between the first end of the second member and at least one of the faying surfaces of the socket. A second state is created when upon application of energy the brazing fill material melts and flows from between the first end of the second member and the at least one of the faying surfaces of the socket, filling the gap between the faying surfaces of the first and second members.

In another embodiment, in the first state a slug of flux material is disposed between at least one of: the first end of the second member and the slug of brazing fill material; or between the slug of brazing fill material and the at least one of the faying surfaces of the socket.

In another embodiment, a radius of the first fillet is at least equal to the width of the gap between the faying surfaces of the first member and the faying surfaces of the second member in the first state.

In another embodiment, at least one additional fillet is formed in the wall faying surface of the socket at locations that correspond to a change in the profile of the second faying surface of the second member. In another embodiment, the at least one additional fillet has a radius at least equal to the width of the gap between the faying surfaces of the first member and the faying surfaces of the second member in the first state. In another embodiment, end points of a curve defining a surface of the at least one additional fillet are extended to form indexing guides configured to position the faying surfaces of the first member with the faying surfaces of the second member.

In another embodiment, e.g., where the joint is part of a locomotive traction motor or other motor, the first member includes an annular ring and the second member includes a conductor bar.

In another embodiment, a volume of the brazing fill material slug is equal to a volume of the socket less a volume of the portion of the first end of the second member in the socket multiplied by a factor of two. In another embodiment, the volume of the brazing fill material slug is within the range of 1.8-2.2 units of volume.

In another embodiment, the joint further includes an indexing guide configured to position the faying surfaces of the second member in a pre-determined alignment with the faying surfaces of the socket of the first member, forming an indexed closed socket brazing brazed joint. In another embodiment, the indexing guide includes at least one of: a first surface, a contact surface, or a second surface. In another embodiment, the indexing guide includes at least the contact surface, and the contact surface is configured to self-align the faying surfaces of the second member.

In another embodiment, the indexing guide is comprised of at least one of: brazing fill material, flux, and/or material that vaporizes upon joint formation (e.g., upon the application of energy to one or both members).

In another embodiment, the indexing guide is configured to increase available faying surface area.

In an embodiment, a motor includes an annular end ring and a conductor bar that are joined to one another at a closed socket brazed joint. The conductor bar has a first end having a first profile with at least first and second faying surfaces. A socket is formed in the end ring and configured to receive the first end of the conductor bar. The socket has faying surfaces with at least two portions separated by a first fillet. The socket further is configured such that in a first state before the application of energy to the joint there is a gap with a width between the faying surfaces of the end ring and the faying surfaces of the conductor bar. In the first state a slug of brazing fill material is disposed between the first end of the conductor bar and at least one of the faying surfaces of the socket. A second state is created when upon application of energy the brazing fill material melts and flows from between the first end of the conductor bar and the at least one of the faying surfaces of the socket, filling the gap between the faying surfaces of the ring and conductor bar. Additional such sockets may be formed in the ring, with additional conductor bars joined to the ring in the same manner. Second, distal ends of the conductor bars may be similarly joined to a second annular end ring, that is, two spaced apart end rings are connected by plural conductor bars extending therebetween, where the conductor bars are joined to the rings by closed socket brazed joints as described.

In another embodiment, a brazed joint assembly (e.g., for a locomotive traction motor, other motor, or other metal joining application) includes at least one closed socket brazed joint having at least first and second members with respective faying surfaces. It also includes at least one indexed closed socket brazed joint having at least the first member, a third member, and at least one index guide. The at least one index guide of the at least one indexed closed socket brazed joint is configured to align the faying surfaces of the at least first and second members of the at least one closed socket brazed joint.

In another embodiment, the first member is an annular ring, the second member is a first conductor bar, and the third member is a second conductor bar.

In another embodiment, the annular ring has at least three indexed closed socket brazed joints spaced apart from one another by 120° with respect to a center axis of the annular ring.

In another embodiment, an apparatus includes a first member, one or more second members, and one or more third members. The first member is respectively joined to the one or more second members by one or more closed socket brazed joints; respective ends of the one or more second members are disposed in respective one or more first sockets formed in the first member. The ends of the one or more second members and the one or more first sockets have respective faying surfaces. The first member is respectively joined to the one or more third members by one or more indexed closed socket brazed joints; respective ends of the one or more third members are disposed in respective one or more second sockets formed in the first member. Each of the one or more second sockets includes a respective at least one index guide (that is, each second socket includes one or more respective index guides). The index guide(s) are configured to align the faying surfaces of the first and one or more second members of the closed socket brazed joint(s). That is, in one aspect, some sockets have index guides and some do not, but the sockets with the index guides serve to index all the second and third members attached to the first member, when they are all joined in an assembly.

In another embodiment, a method (e.g., a method for forming a closed socket brazing brazed joint for a locomotive traction motor, other motor, or other joined-part assembly) includes providing a first member composed of a first base material; providing a second member composed of a second base material and having a first end included of a first profile with at least first and second faying surfaces; forming in the first member a socket having plural faying surfaces with at least two portions separated by a fillet, the socket configured to receive the first end of the second member, wherein a radius of the fillet is at least equal to a distance between the faying surfaces of the first and second members when the first end of the second member is disposed in the socket; placing a slug of brazing fill material in the socket formed in the first member, the slug of brazing fill material substantially in conformation with the first profile of the first end of the second member; placing the first end of the second member into the socket of the first member, trapping the slug of brazing fill material; applying energy to at least one of the first base material of the first member or the second base material of the second member; and melting the brazing fill material.

In another embodiment, the method further includes calculating a volume for the brazing fill material as equal to a volume of the socket formed in the first member less a volume of the portion of the first end of the second member in the socket multiplied by a factor of two. The slug of brazing fill material that is provided has a volume corresponding to the volume that is calculated.

In another embodiment, the method further includes, in the socket formed in the first member, forming an indexing guide configured to position the faying surfaces of the second member in a pre-determined alignment with the faying surfaces of the socket formed in the first member.

In another embodiment, an apparatus (e.g., for a locomotive traction motor, other motor, or other joined-part assembly) includes a first member having a top first surface. The first member defines a closed socket formed into the top first surface. The socket is defined by plural faying surfaces, with the plural faying surfaces including a peripheral sidewall and a floor. The peripheral sidewall extends from the first surface and terminates at the floor. The floor and first surface are spatially independent surfaces (e.g., they do not intersect with one another, for example they may be parallel to one another). The peripheral sidewall is transitioned to the floor by a fillet. The socket is dimensioned to receive an end of a second member, the second member having plural faying surfaces, for joining the second member to the first member.

In another embodiment, the peripheral sidewall defines plural indexing guides. The indexing guides are configured to position faying surfaces of the end of the second member in a pre-determined alignment with the faying surfaces of the socket, for forming an indexed closed socket brazed joint.

In another embodiment, the fillet has a radius corresponding to a width of a distance between the sidewall and one or more of the faying surfaces of the end of the second member that are closest to the sidewall when the end of the second member is fully disposed in the socket.

In another embodiment, the fillet extends along partial portions of a junction between the floor and the peripheral wall.

In another embodiment, the sidewall includes a first pair of co-planar wall portions, and the sidewall includes a first indexing guide. The first indexing guide has a long axis oriented at a perpendicular or near-perpendicular angle relative to the first surface and a transverse axis defining a depth of the first indexing guide. The first indexing guide protrudes out from the first pair of co-planar wall portions towards a center of the socket. The first indexing guide has a first surface, a contact surface, and a second surface. The first surface transitions from one of the first pair of co-planar wall portions to the contact surface, and the second surface transitions from the contact surface to the other of the first pair of co-planar walls. The contact surface is aligned with the long axis of the first indexing guide.

In another embodiment, the sidewall includes a second pair of co-planar wall portions. The sidewall includes a second indexing guide. The second indexing guide has a long axis oriented at a perpendicular or near-perpendicular angle (relative to the first surface) and a transverse axis defining a depth of the second indexing guide. The second indexing guide protrudes out from the second pair of co-planar wall portions towards the center of the socket. The second indexing guide has a first surface, a contact surface, and a second surface. The first surface of the second indexing guide transitions from one of the second pair of co-planar wall portions to the contact surface of the second indexing guide, and the second surface of the second indexing guide transitions from the contact surface of the second indexing guide to the other of the second pair of co-planar walls. The contact surface of the second indexing guide is aligned with the long axis of the second indexing guide. The first indexing guide is located on a first side of the socket and the second indexing guide is located on a second side of the socket opposite the first indexing guide.

In another embodiment, the peripheral sidewall defines plural indexing guides protruding inwards toward a center of the socket. The indexing guides are configured to position the faying surfaces of the end of the second member in a pre-determined alignment with the faying surfaces of the socket, for forming an indexed closed socket brazed joint. The fillet has a radius corresponding to a width of a distance between the sidewall and one or more of the faying surfaces of the end of the second member that are closest to the sidewall when the end of the second member is fully disposed in the socket. The socket is elongate and has a length that is greater than a width of the socket and a depth of the socket, and the fillet extends along an entirety of a junction between the floor and the peripheral wall, and the peripheral wall at a first distal end of the socket is rounded to form a filleted end and the peripheral wall at a second distal end of the socket includes two adjacent, rounded lobe portions.

In another embodiment, a motor includes a metallic, annular end ring having a top first surface. The end ring defines a closed socket formed into the top first surface. The socket is defined by plural faying surfaces, with the plural faying surfaces including a peripheral sidewall and a floor. The peripheral sidewall extends from the first surface and terminates at the floor. The floor and first surface are spatially independent surfaces (e.g., they do not intersect or directly connect with one another, for example they may be parallel to one another). The peripheral sidewall is transitioned to the floor by a fillet. The socket is dimensioned to receive an end of a conductor bar, the conductor bar having plural faying surfaces, for joining the conductor bar to the end ring.

Finally, the written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A locomotive traction motor comprising:
    a first member having a socket with a floor and opposing first and second side walls with the floor separated from each of the opposing first and second side walls by first fillets having a first radius between the floor and each of the opposing first and second side walls; and
    a second member with a first end having first and second faying surfaces separated from each other by a third faying surface, the socket of the first member configured to receive the first end of the second member with the first end of the second member facing the floor of the first member in the socket, the first faying surface of the second member facing the first side wall of the first member, and the second faying surface of the second member facing the second side wall of the first member;
    wherein the socket further is configured such that, in a first state before application of energy to a joint, there are gaps with widths between the opposing first and second side walls of the first member and the first and second faying surfaces of the second member, and, in the first state, a slug of brazing fill material is disposed between the first end of the second member and the floor of the socket in the first member; and
    wherein a second state is created when, upon application of energy, the brazing fill material melts, flows from between the first end of the second member and the floor of the socket in the first member, and fills the gaps between the first and second faying surfaces of the second member and the opposing first and second side walls to form a closed socket brazed joint that joins the first and second members.

2. The locomotive traction motor of claim 1, wherein, in the first state, a slug of flux material is disposed between
    the first end of the second member and the slug of brazing fill material; or
    between the slug of brazing fill material and one or more of the first or second side walls of the socket.

3. The locomotive traction motor of claim 1, wherein the first radius of the first fillet is at least one of the widths of the gaps between the opposing first and second side walls of the first member and the first and second faying surfaces of the second member in the first state.

4. The locomotive traction motor of claim 1, wherein the first fillet is between the first side wall and the floor of the first member, and further comprising:
    at least one additional fillet having the first radius or a second radius and formed between the second side wall of the first member and the floor of the first member.

5. The locomotive traction motor of claim 4, wherein the at least one additional fillet has the second radius that is at least one of the widths of the gaps in the first state.

6. The locomotive traction motor of claim 4, wherein end points defining a surface of the at least one additional fillet are extended to form indexing guides configured to position the first and second side walls of the first member with the first and second faying surfaces of the second member.

7. The locomotive traction motor of claim 1, wherein the first member comprises an annular ring and the second member comprises a conductor bar.

8. The locomotive traction motor of claim 1, wherein a first volume of the slug of brazing fill material is twice a difference between a second volume of the socket and a third volume of a third portion of the first end of the second member that is in the socket.

9. The locomotive traction motor of claim 8, wherein the first volume of the slug of brazing fill material is within a range of 1.8 to 2.2 times the difference between the second volume and the third volume.

10. The locomotive traction motor of claim 1, further comprising:
    an indexing guide configured to position the first and second faying surfaces of the second member in a pre-determined alignment with the opposing first and second side walls of the socket of the first member, the indexing guide also configured to position the second member to form an indexed closed socket brazed joint.

11. The locomotive traction motor of claim 10, wherein the indexing guide is comprised of at least one of: a first surface, a contact surface, or a second surface.

12. The locomotive traction motor of claim 10, wherein the indexing guide does not contact the first and second faying surfaces of the second member.

13. The locomotive traction motor of claim 10, wherein the indexing guide is composed from at least one of: brazing fill material, flux, or material that vaporizes upon joint formation.

14. The locomotive traction motor of claim 10, wherein the indexing guide is configured to increase available faying surface area.

15. A vehicle traction motor comprising:
    a first member having a socket with a floor and opposing first and second side walls with a curved interface between the floor and each of the first side wall and the second side wall; and
    a second member with a first end having a first profile with faying surfaces;
    wherein the socket is configured such that, in a first state before application of energy to a joint, there is a gap between each of the first and second side walls of the first member and each of the faying surfaces of the second member, and, in the first state, a slug of brazing fill material is disposed between the first end of the second member and the floor of the socket; and
    wherein a second state is created when, upon application of energy, the brazing fill material melts and flows from between the first end of the second member and fills the gap between each of the first and second side walls and the first and second faying surfaces of the socket to form a closed socket brazed joint that joins the first and second members.

16. The vehicle traction motor of claim 15, wherein, in the first state, a slug of flux material is disposed between:
    the first end of the second member and the slug of brazing fill material; or
    between the slug of brazing fill material and the at least one of the first side wall or the second side wall of the socket.

17. The vehicle traction motor of claim 15, wherein a radius of the curved interface is at least as large as a width of the gap between the first side wall of the first member and the first faying surface of the second member in the first state.

18. The vehicle traction motor of claim 15,
wherein end points defining a surface of the curved interface are extended to form indexing guides configured to position the first and second side walls of the first member with the first and second faying surfaces of the second member.

* * * * *